Dec. 21, 1954
F. V. JOHNSON
2,697,354
ERECTING DEVICE FOR VERTICAL GYROSCOPES
Filed Nov. 12, 1949
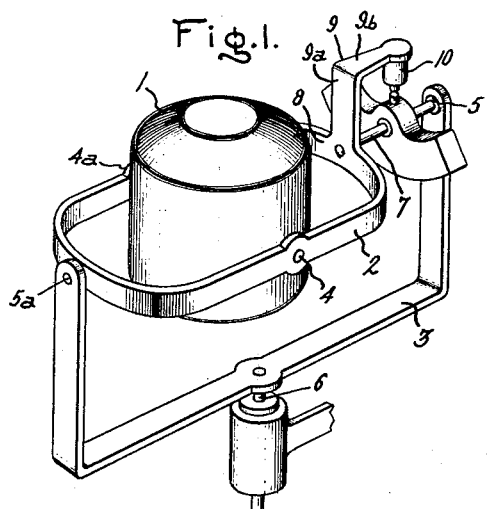
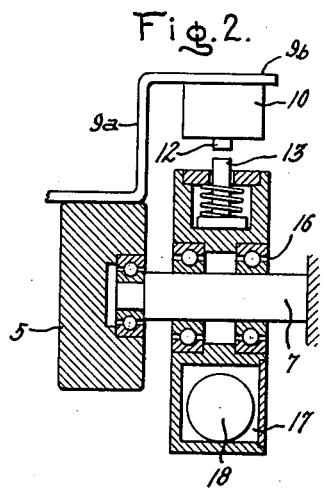
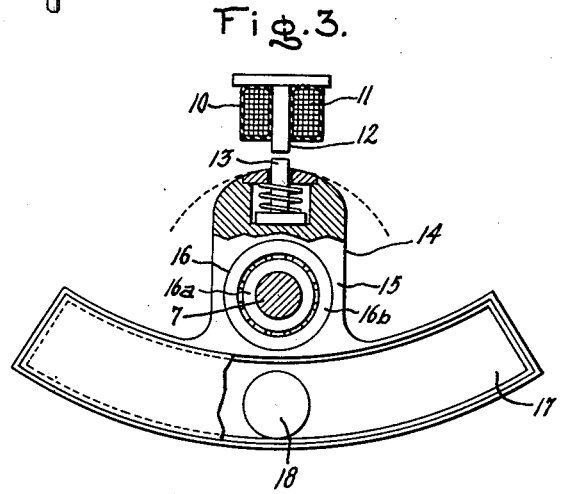
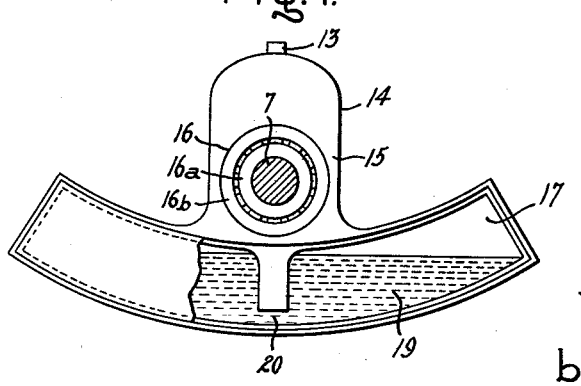
Inventor:
Frithiof V. Johnson,
by Claude A. Mott
His Attorney.

United States Patent Office 2,697,354
Patented Dec. 21, 1954

2,697,354

ERECTING DEVICE FOR VERTICAL GYROSCOPES

Frithiof V. Johnson, Scotia, N. Y., assignor to General Electric Company, a corporation of New York Application November 12, 1949, Serial No. 126,737

3 Claims. (Cl. 74—5.44)

This invention relates to a vertical gyroscope and, in particular, to a device for erecting a gyroscope to the vertical position.

Vertical gyroscopes are an essential element in many modern devices, such as airborne sextants and naval gun-laying equipment. For operation of these devices, it is necessary to be able to establish at all times a stable vertical direction.

It is an object of this invention to provide an improved device for the erection of vertical gyroscopes.

It is a further object of this invention to provide a device for the erection of vertical gyroscopes which will be simple in installation.

It is a still further object of this invention to provide an erecting device which will not interfere with the normal operation of the vertical gyroscope.

Further objects and advantages of this invention will become apparent and the invention will be better understood from the following description referring to the accompanying drawing, and the features of novelty which characterize this invention will be pointed out with particularity in the claims annexed to and forming a part of this specification.

Broadly, this invention comprises the use of a segment of circular tubing in which there has been placed a ball-like weight or a quantity of heavy liquid. The motion of the weight or the liquid under the action of gravity is restricted in a manner that produces an erecting torque on a gyroscope to which the tube is connected, if it is in other than a vertical position.

In the drawing, Fig. 1 is a front elevation view of the gyroscope assembly in combination with the erecting device; Fig. 2 is a side view, partly in section, of the erecting device attached to a gyroscopic unit; Fig. 3 is a front view, partly in section, showing the elements of the erecting device in greater detail; while Fig. 4 is a modification of the erecting device.

Referring to the drawing, a gyro motor 1 is mounted in a suspension that comprises gimbal 2 mounted in U-support 3. Gyro motor 1 is supported at bearings 4 and 4a in gimbal 2, while gimbal 2 is supported in bearings 5 and 5a in U-support 3 giving complete freedom of movement of the gyro motor. The U-support 3, in turn, is mounted upon a shaft 6, which is rotated at a slow rate of speed to average out any unbalance or friction that might exist in the gimbal system.

Gimbal 2 is directly connected to bearing 5 by shaft 7, and this arrangement permits gimbal 2 to freely pivot about an axis that passes through bearings 5 and 5a. An extension 9 is provided at end 8 of gimbal 2. Extension 9 is formed of a vertical portion 9a extending upwardly from gimbal 2 and a horizontal portion 9b extending away from end 8 of gimbal 2. An electromagnet 10 is mounted on the under side of horizontal portion 9b with the axis of its core extending downwardly from portion 9b.

Electromagnet 10 comprises a coil portion 11 and a core portion 12 which is operatively engageable with an armature 13 located within an erecting device 14.

Erecting device 14 comprises a body portion 15 having a centrally located horizontal bearing 16 passing through its entire length. The inner race 16a of bearing 16 is secured to shaft 7, while the outer race 16b is secured to body portion 15. A tube 17, in the form of an arc of a circle, and having an internal cross section of any convenient shape, such as square or circular, is provided in a vertical plane below bearing 16 within body portion 15.

Within tube 17, a heavy ball 18 is located. Ball 18 is of such diameter as to nearly fill the cross section of tube 17.

When body portion 15 of erecting device 14 is rotated about shaft 7 passing therethrough, ball 18 rolls, depending upon the tilt of the body portion until it reaches the lowermost portion of the arc of circular tube 17. A viscous fluid, such as oil, is placed in the circular tube 17 restricting the movement of ball 18 toward the lowermost portion of the tube. When the viscous liquid within the tube restricts the movement of ball 18, a torque is exerted about shaft 7 that tends to erect the gyro.

When it is desired to place the erecting device in operation, electromagnet 10 is energized and core 12 attracts armature 13 in the body portion 15 of erecting device 14. Armature 13 is thus locked to core 12, and erecting device 14 turns with gimbal 2 about axis 5—5a.

The entire erecting device is so proportioned as to be statically balanced about bearing 16 when ball 18 is given time to assume its steady state position in the tube 17. Thus, if the erecting device is tilted and permitted to rest in the tilted position until ball 18 has reached its final position against the restraint of the viscous liquid, it exerts no torque on the gimbal about axis 5—5a.

The operation of the erecting device may be described as follows, with reference to Fig. 1. Suppose the top of the gyroscope to be tilted away from the vertical toward, say, the north; and at the initial instant, suppose shaft 7 to be pointed north. Pivot axis 4—4a is then horizontal, and erecting device 14, which is coupled to the gimbal 2, has no tilt about axis 5—5a. As U-support 3 rotates clockwise until pivot shaft 5 points east, the gimbal tilts clockwise, viewed from the outer end of shaft 7, because the gyroscope continues to incline toward the north.

As rotation of U-support 3 continues, the tilt of the erecting device 14 decreases until it is again zero when shaft 7 points south. In the remaining portion of the revolution, in a similar manner, it tilts counterclockwise, viewed from the end of shaft 7, and then returns to zero tilt as shaft 7 again points north.

During this tilting of the erection device, ball 18 tends to roll so as to remain in the lowest part of tube 17. If it were not restrained by the liquid, so that it could continuously find the lowest position, it would continue to exert no torque on the gimbal, because of the condition of static balance of the erecting device. However, the viscous restraint to its motion causes it continuously to lag behind its steady state position so that the entire erecting device appears to be unbalanced and exerts a torque on gimbal 2. This torque is greatest where the velocity of tilt of the erecting device is greatest, which, in the above example, occurs when the axis 5—5a pass through the north-south direction. The resultant torque is one which precesses the gyroscope axis toward a position where the rolling of the ball is zero, that is, toward the vertical, provided the rotation of the gyroscope wheel and of U-support 3 are in the same direction.

A quadrature component of torque is also present which tends to cause the gyroscope to approach the vertical in a spiral manner. This component can be made as small as desired by increasing the weight of the ball 18 or increasing the radius of curvature of tube 17. For this reason, it is desirable to make the ball out of a heavy metal, such as a tungsten alloy.

During periods when the gyroscope is subjected to large horizontal accelerations, as when the craft on which it is mounted turns while traveling at high speed, the erecting device is uncoupled from the gimbal of the gyroscope by de-energizing electromagnet 10. This leaves the gyroscope free from large disturbing torques.

It is to be noted that the subject erecting device does not require any mechanical connection to the rotor shaft of the gyroscope, thus placing no restrictions on its design and permitting the gyroscope to be hermetically sealed. It also leaves both ends of the gyroscope free for the mounting of pick-offs and torque applying devices used to apply various types of corrections. The erector requires no additional electrical connections to the gyroscope itself for the purpose of engaging and disengaging it. Further, no accuracy of alignment whatever is necessary between the erector and the gyroscope gimbal in order to obtain accurate erection.

A modification of the subject erecting device is shown in Fig. 4. A pool of mercury 19 is placed within the segment of circular tube 17 and an orifice 20 is positioned in the longitudinal center of the tube. Under these circumstances, when erecting device 14 is tilted, the mercury pool tends to seek a level position, but orifice 20 in tube 17 prevents the mercury from immediately finding its own level. Consequently, a torque is produced by the weight of the mercury that is unbalanced. The operation of the modification of this invention is identical to the operation of the erecting device employing a ball. The difference, of course, is that the erecting torque is produced by the unbalanced mercury, rather than the displaced ball.

Other modifications of this invention will occur to those skilled in the art and it is desired to be understood, therefore, that this invention is not to be limited to the particular arrangement disclosed, but that the appended claims are meant to cover all the modifications which do not depart from the spirit and scope of this invention.

What I claim as new and desire to secure by Letters Patent of the United States is:

1. In a vertical gyroscope, a gimbal disposed in a horizontal plane, means for rotating said gimbal about a vertical axis, a supporting member, support means mounting said gimbal for rotation about a generally horizontal axis comprising a horizontally disposed shaft secured to said gimbal and bearing means rotatably positioning said shaft on said supporting member, and an erecting device for said gimbal comprising an arcuate shaped tubular member containing a viscous liquid and a ball of substantial mass, means suspending said tubular member from said shaft for rotation with respect thereto, and means for coupling said tubular member to said gimbal to impose an erecting torque on said gimbal in response to displacement of said gimbal out of a horizontal plane.

2. In a vertical gyroscope, a gimbal disposed in a horizontal plane, means for rotating said gimbal about a vertical axis, a supporting member, support means mounting said gimbal for rotation about a generally horizontal axis comprising a horizontally disposed shaft secured to said gimbal and bearing means rotatably positioning said shaft on said supporting member, and an erecting device for said gimbal comprising an arcuate shaped tubular member containing a liquid of substantial mass and an orifice for restricting the flow thereof, means suspending said tubular member from said shaft for rotation with respect thereto, and means for coupling said tubular member to said gimbal to impose an erecting torque on said gimbal in response to displacement of said gimbal out of a horizontal plane.

3. In a vertical gyroscope, a gimbal continuously rotated about a vertical axis, a gyro motor supported by said gimbal, means for supporting said gimbal in a generally horizontal plane comprising a supporting member, support means mounting said gimbal for rotation about a generally horizontal axis comprising a horizontally disposed shaft secured to said gimbal and bearing means rotatably positioning said shaft on said supporting member, an upwardly and outwardly directed extension rigidly secured to said gimbal, an electromagnet positioned on said extension, an erecting device comprising a housing rotatably supported on said horizontal shaft, an armature in the upper portion of said housing with said armature adapted to be engaged by and magnetically locked to said electromagnet, an arcuate shaped tubular member containing a gravity responsive mass movable relative thereto, means for restricting the movement of said gravity responsive mass whereby an erecting torque is placed on said gimbal when said electromagnet is energized and said gimbal is displaced from a horizontal plane.

References Cited in the file of this patent

UNITED STATES PATENTS

| Number | Name | Date |
| --- | --- | --- |
| 1,634,140 | Gilbert | June 28, 1924 |
| 2,198,551 | Mellier | Apr. 23, 1940 |
| 2,439,418 | Davenport | Apr. 13, 1948 |